United States Patent
Levy et al.

(10) Patent No.: US 7,356,768 B1
(45) Date of Patent: Apr. 8, 2008

(54) USING DOCUMENT TEMPLATES TO ASSEMBLE A COLLECTION OF DOCUMENTS

(75) Inventors: Philip Levy, Los Altos, CA (US); Naoki Hada, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 329 days.

(21) Appl. No.: 10/305,717

(22) Filed: Nov. 27, 2002

(51) Int. Cl.
*G06F 17/00* (2006.01)

(52) U.S. Cl. .................. 715/530; 715/501.1; 715/513; 709/203

(58) Field of Classification Search ............... 715/530, 715/513, 501.1, 523, 526; 709/206, 223, 709/232, 203
See application file for complete search history.

(56) References Cited

U.S. PATENT DOCUMENTS

| | | | |
|---|---|---|---|
| 4,945,475 A | 7/1990 | Kanoh et al. ................... 707/1 |
| 5,043,891 A * | 8/1991 | Goldstein et al. ............ 715/531 |
| 5,228,121 A * | 7/1993 | Fontaine et al. ............. 715/531 |
| 5,301,286 A | 4/1994 | Rajani ......................... 711/202 |
| 5,446,653 A * | 8/1995 | Miller et al. ...................... 705/4 |
| 5,530,852 A | 6/1996 | Meske, Jr. et al. ........... 709/206 |
| 5,572,643 A | 11/1996 | Judson ......................... 709/218 |
| 5,659,729 A | 8/1997 | Nielsen .......................... 707/3 |
| 5,745,908 A | 4/1998 | Anderson et al. ............ 715/513 |
| 5,764,908 A * | 6/1998 | Shoji et al. ................... 709/217 |
| 5,809,250 A * | 9/1998 | Kisor .......................... 709/227 |
| 5,864,852 A * | 1/1999 | Luotonen ...................... 726/14 |
| 5,873,077 A | 2/1999 | Kanoh et al. .................... 707/3 |
| 5,887,171 A | 3/1999 | Tada et al. .................. 719/317 |
| 5,893,914 A * | 4/1999 | Clapp .......................... 715/507 |
| 5,930,813 A * | 7/1999 | Padgett et al. .............. 715/539 |
| 5,937,406 A | 8/1999 | Balabine et al. ............. 707/100 |
| 5,940,843 A * | 8/1999 | Zucknovich et al. ........ 715/516 |
| 5,953,732 A * | 9/1999 | Meske et al. ................ 715/513 |
| 5,987,480 A * | 11/1999 | Donohue et al. ......... 715/501.1 |
| 6,026,433 A * | 2/2000 | D'Arlach et al. ........... 709/217 |

(Continued)

FOREIGN PATENT DOCUMENTS

EP          0 281 225          9/1988

(Continued)

OTHER PUBLICATIONS

Bertino, et al. "An Evaluation of Text Access Methods", Instituto di Elaborazione dell'Informazione, 1989, IEEE, pp. 810-819.

(Continued)

*Primary Examiner*—Doug Hutton
*Assistant Examiner*—James H. Blackwell
(74) *Attorney, Agent, or Firm*—Fish & Richardson P.C.

(57) ABSTRACT

Methods and apparatus, including computer program products, to assemble a collection of documents according to a document list. The document list represents documents to be included in the collection, and includes multiple entries that identify document templates. Each document template includes instructions that a web server can execute to generate a web document based on one or more parameters. A web document corresponding to each of the multiple entries is requested; the requested web documents are received and stored in the collection of documents. Links in the received web documents can be identified and updated. The collection of documents can be accessed as part of a web site.

26 Claims, 5 Drawing Sheets

U.S. PATENT DOCUMENTS

| | | | | |
|---|---|---|---|---|
| 6,029,182 | A * | 2/2000 | Nehab et al. | 715/523 |
| 6,061,698 | A * | 5/2000 | Chadha et al. | 715/513 |
| 6,061,700 | A * | 5/2000 | Brobst et al. | 715/517 |
| 6,072,461 | A * | 6/2000 | Haran | 345/629 |
| 6,096,096 | A * | 8/2000 | Murphy et al. | 717/175 |
| 6,115,723 | A | 9/2000 | Fallside | 715/513 |
| 6,167,409 | A | 12/2000 | DeRose et al. | 715/513 |
| 6,192,382 | B1 * | 2/2001 | Lafer et al. | 715/513 |
| 6,208,995 | B1 * | 3/2001 | Himmel et al. | 707/104.1 |
| 6,209,004 | B1 * | 3/2001 | Taylor | 715/500 |
| 6,237,011 | B1 | 5/2001 | Ferguson et al. | 715/515 |
| 6,237,060 | B1 * | 5/2001 | Shilts et al. | 711/100 |
| 6,243,740 | B1 * | 6/2001 | Minneman et al. | 709/206 |
| 6,263,352 | B1 * | 7/2001 | Cohen | 715/513 |
| 6,308,188 | B1 * | 10/2001 | Bernardo et al. | 715/530 |
| 6,313,835 | B1 * | 11/2001 | Gever et al. | 715/846 |
| 6,351,755 | B1 * | 2/2002 | Najork et al. | 715/501.1 |
| 6,377,993 | B1 * | 4/2002 | Brandt et al. | 709/227 |
| 6,411,996 | B1 * | 6/2002 | Albers | 709/223 |
| 6,415,278 | B1 | 7/2002 | Sweet et al. | 707/2 |
| 6,449,636 | B1 * | 9/2002 | Kredo et al. | 709/206 |
| 6,460,060 | B1 * | 10/2002 | Maddalozzo et al. | 715/513 |
| 6,493,758 | B1 * | 12/2002 | McLain | 709/227 |
| 6,538,673 | B1 * | 3/2003 | Maslov | 715/853 |
| 6,567,799 | B2 * | 5/2003 | Sweet et al. | 707/2 |
| 6,594,682 | B2 * | 7/2003 | Peterson et al. | 718/102 |
| 6,605,120 | B1 * | 8/2003 | Fields et al. | 715/513 |
| 6,681,255 | B1 * | 1/2004 | Cooper et al. | 709/232 |
| 6,769,009 | B1 * | 7/2004 | Reisman | 709/201 |
| 6,789,080 | B1 | 9/2004 | Sweet et al. | 707/10 |
| 6,810,404 | B1 * | 10/2004 | Ferguson et al. | 707/200 |
| 6,864,904 | B1 * | 3/2005 | Ran et al. | 715/760 |
| 6,907,463 | B1 * | 6/2005 | Kleinpeter, III et al. | 709/228 |
| 6,925,594 | B2 * | 8/2005 | Dutta et al. | 715/501.1 |
| 6,990,633 | B1 * | 1/2006 | Miyasaka et al. | 715/517 |
| 7,039,658 | B2 * | 5/2006 | Starkey | 707/203 |
| 7,085,997 | B1 * | 8/2006 | Wu et al. | 715/501.1 |
| 2001/0034658 | A1 * | 10/2001 | Silva et al. | 705/26 |
| 2001/0047326 | A1 * | 11/2001 | Broadbent et al. | 705/38 |
| 2001/0047375 | A1 * | 11/2001 | Fest | 707/526 |
| 2001/0054020 | A1 * | 12/2001 | Barth et al. | 705/37 |
| 2002/0026462 | A1 * | 2/2002 | Shotton et al. | 707/523 |
| 2002/0032701 | A1 * | 3/2002 | Gao et al. | 707/513 |
| 2002/0065851 | A1 * | 5/2002 | Watson et al. | 707/513 |
| 2002/0103828 | A1 * | 8/2002 | Kupiec et al. | 707/513 |
| 2002/0152245 | A1 * | 10/2002 | McCaskey et al. | 707/530 |
| 2002/0178190 | A1 * | 11/2002 | Pope et al. | 707/530 |
| 2002/0188633 | A1 * | 12/2002 | Davis et al. | 707/513 |
| 2002/0198962 | A1 * | 12/2002 | Horn et al. | 709/218 |
| 2003/0061569 | A1 * | 3/2003 | Aoki | 715/517 |
| 2003/0135824 | A1 * | 7/2003 | Ullmann et al. | 715/513 |
| 2003/0172343 | A1 * | 9/2003 | Leymaster et al. | 715/500 |
| 2003/0212891 | A1 * | 11/2003 | Evans et al. | 713/168 |
| 2004/0012625 | A1 * | 1/2004 | Lei et al. | 345/738 |
| 2004/0030741 | A1 * | 2/2004 | Wolton et al. | 709/202 |
| 2004/0205654 | A1 * | 10/2004 | Eisen | 715/530 |
| 2005/0028090 | A1 | 2/2005 | Sweet | |
| 2005/0091340 | A1 * | 4/2005 | Facemire et al. | 709/218 |

FOREIGN PATENT DOCUMENTS

| | | |
|---|---|---|
| EP | 0 620 517 A1 | 10/1994 |
| JP | 6301732 | 10/1994 |
| JP | 6309128 | 11/1994 |
| WO | WO 99/35592 | 7/1999 |

OTHER PUBLICATIONS

Database Internet, Online, www.easysw.com; Mar. 10, 1998.

Skinner R., "Cross-Platform Formatting Programs" Library Software Review, Summer 1994, USA, vol. 13, No. 2, pp. 152-156.

Yoo, et al. "Performance Evaluation of Dynamic Signature File Methods", COMPSAC '95, IEEE, Aug. 1995 p. 144-149.

Hrvoje Niksic, Jun. 23, 1996, "Geturl: Software for non-interactive downloading," webpage: http://groups.google.com/group/comp.infosystems.www.announce/msg/4268334d269d42ce.

Kuma, "Home Page Super Technique: Magnificent Arrangement for your Home Page by Java, Movie, etc."Mac Fan Internet, K.K. Mainichi Communications, Aug. 1, 1997, vol. 2, No. 8, pp. 130-133.

Yamashima, "Introduction of a Manual Production System using SGML", Research Report of the Society of Information Processing, Corporation of Society of Information Processing, Sep. 19, 1997, vol. 97, No. 93, p. 25-30.

* cited by examiner

USING DOCUMENT TEMPLATES TO ASSEMBLE A COLLECTION OF DOCUMENTS

BACKGROUND OF THE INVENTION

The present invention relates to generating electronic documents.

The Internet is a global network that uses a common communication protocol, the Transfer Control Protocol/ Internet Protocol ("TCP/IP"), to transmit data from one computer to another. In order to use the transmitted data, computer applications adopt communication standards. For example, the World Wide Web ("Web") is a system that includes server applications supporting Hyper Text Markup Language ("HTML") documents. Such computer applications are referred to as web servers, because they deliver, i.e., 'serve', electronic documents to users on the Web. The served documents are called web pages or web documents. Each web document has a Uniform Resource Locator ("URL") address that allows web users to request the web document from a corresponding server and to view the requested document, for example, by using web browsers, such as Netscape Navigator or Microsoft Internet Explorer. Web documents can include images, texts, scripts, or any other content in HTML or any other format.

A web server can serve web documents from one or more web sites. Each web site is a collection of web documents and can include static web documents, document templates, or both. A static web document, also called static web page, has only static content that is provided each time the document is requested from the server. A document template, also called dynamic web page, identifies a class of web documents; an instance of the class is generated each time a web document is requested according to the template. The generated web document depends on parameters that can be specified by the web server, can be a result of communication with a user, or can be directly included in a URL request. The document template includes instructions for generating the requested web document that are typically implemented using a server side scripting technology such as Active Server Pages ("ASP"), JavaServer Pages ("JSP"), and PHP Hypertext Preprocessor ("PHP"). In addition to instructions, document templates can include static content, for example, in HTML format.

SUMMARY OF THE INVENTION

The invention provides computer-implemented methods and apparatus for assembling a collection of documents according to a document list identifying web documents to be collected. In general, in one aspect, the invention provides methods, systems and apparatus, including computer program products, that implement techniques for assembling a collection of documents. The techniques include receiving a document list that represents documents to be included in the collection. The document list includes multiple entries identifying document templates. Each document template includes instructions that a web server can execute to generate a web document based on one or more parameters. A web document corresponding to each of the multiple entries is requested; the requested web documents are received and stored in the collection of documents.

Particular implementations can include one or more of the following features. Links can be established between the received web documents stored in the collection. Establishing the links can include identifying links in the received web documents and updating the identified links. The identified links can refer to one or more web documents represented in the document list. The updated links can refer to the corresponding documents in the collection of documents.

The web documents can be requested through the Internet. Each entry in the document list can represent a web document. The document list can include entries representing static web documents to be included in the collection. Access can be provided to the collection of documents as part of a web site. Entries that identify a document template can specify parameters for generating a corresponding web document according to the document template. Requesting the corresponding web document can include passing the specified parameters to a web server for use in preparing the corresponding web document. The document templates can include instructions implemented in ASP, JSP, or PHP technology. The document list can represent documents to be included in the collection by a URL or a URI. A received web document can be an HTML document.

A document list can be received from a user. A portion of the document list can be received in response to a request identifying a document template and a set of parameters. The set of parameters can be used in identifying documents to be included in the collection. The request can be transmitted to a web server to request all or a portion of the document list.

The invention can be implemented to realize one or more of the following advantages. A collection of documents can be assembled from web documents generated by web servers according to document templates. The document templates can rely on standard server side scripting technology such as ASP, JSP, and PHP. The collection of the documents can be controlled by a document list. The document list can be dynamically generated by using the standard document templates. The document list can identify (and the collection can include) web documents that include text, graphics, or any other content in HTML, Portable Document Format ("PDF"), Joint Photographic Experts Group ("JPG"), Graphics Interchange Format ("GIF"), or in any other format. The collection can be assembled automatically. The collection can be assembled without using proprietary scripting techniques. The assembled collection can be used to generate a static web site. In the generated static web site, the static documents can be available even if the web documents used to assemble the collection are not. The static web site may provide faster access to users than the web site serving web documents according to document templates. In the static web site, the static web documents can be served without accessing databases. Static web sites can be designed by using standard document templates.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
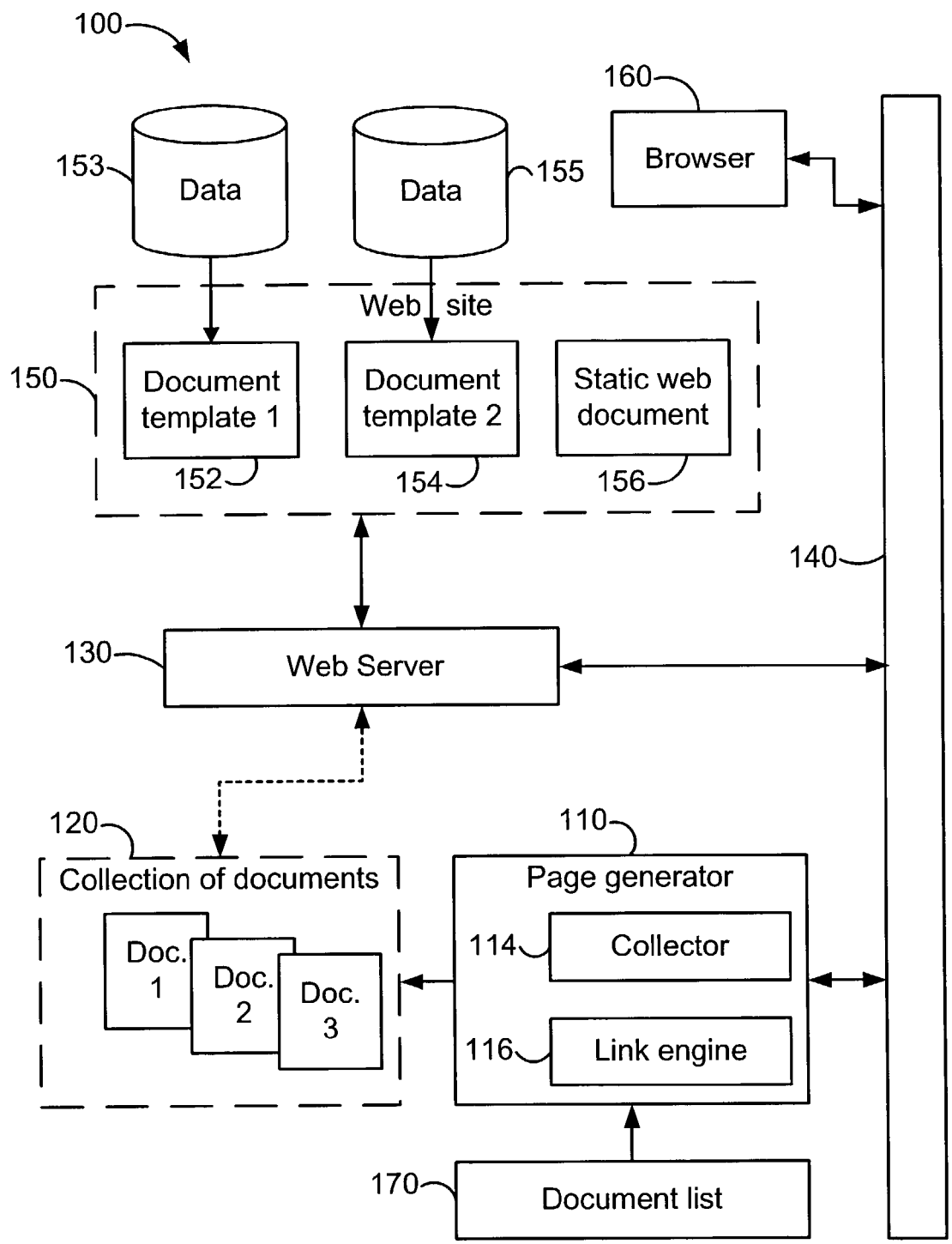
FIG. 1 is a schematic block diagram showing an exemplary system to assemble a collection of documents.

FIG. 1 shows a system 100 that includes a page generator 110 that can be used to assemble a collection of documents 120. In the implementation shown in FIG. 1, the page generator 110 is a computer application that communicates with a web server 130 through a computer network 140 to generate documents for the collection 120. The computer network 140 can be the Internet or any other wide or local area network. In an alternative implementation, the page generator 110 can access the web server 130 directly, without using a computer network.

The page generator 110 uses a document list 170 to assemble the collection 120. The document list 170 represents documents to be included in the collection 120. The represented documents can be web documents, or any other documents that are available locally or over the computer network 140, e.g., by using File Transfer Protocol ("FTP"). In one implementation, the document list 170 includes multiple entries each of which corresponds to a document to be included in the collection 120. Each entry in the document list 170 can explicitly identify a web document that will be used as the source for the corresponding document in the collection 120. Examples of such document lists are discussed below with reference to FIGS. 2A and 2B. In alternative implementations, the document list can implicitly identify one or more web documents to be included in the collection. For example, the document list can identify a web site and specify search parameters to identify corresponding web documents in the web site.

To collect web documents represented by the document list 170, the page generator 110 includes a collector 114 that also stores the collected web documents as the corresponding documents in the collection 120. Details of collecting web documents are discussed below with reference to FIGS. 3 and 4. The page generator 110 also includes a link engine 116 to establish links between the documents in the collection 120. The link engine 116 can use the document list 170 to find and update links in the collected documents as discussed below with reference to FIG. 5.

The page generator 110 can collect web documents from a web site 150 served by the web server 130. In the implementation shown in FIG. 1, web documents from the web site 150 can be also viewed with a web browser 160 connected to the network 140. The web site 150 includes a first document template 152, a second document template 154, and a static document 156. If requested by the page generator 110 (or by the web browser 160), the web server 130 can generate web documents according to the first 152 or the second 154 document templates by incorporating content into the web documents from a first database 153 or a second database 155, respectively. The page generator 110 (or the browser 160) can also request the static document 156 from the server 130. In alternative implementations, document templates can incorporate content from any resource and are not associated with particular databases.

As shown in FIG. 1, once assembled, the collection of documents 120 can be made accessible on the network 140 by connecting it to the web server 130. In alternative implementations, documents in the collection 120 can be made accessible by connecting the collection 120 to another web server.

Figure 2A:
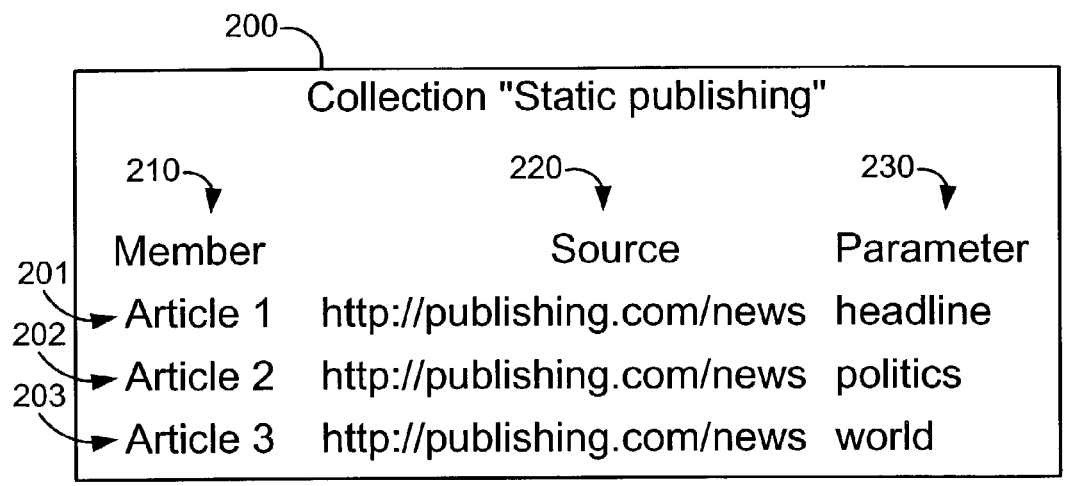
FIGS. 2A and 2B show exemplary document lists.
Figure 2B:
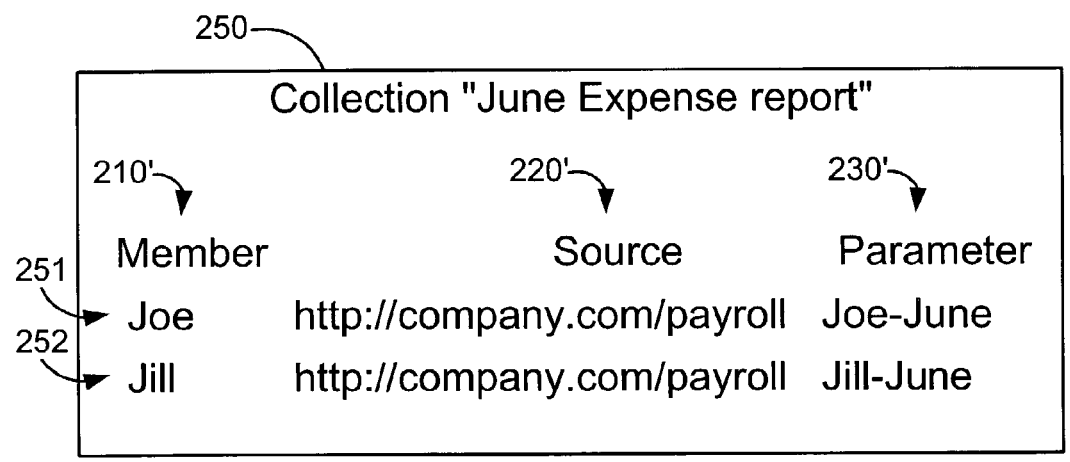

FIG. 2A shows an exemplary list 200 that can be used as the document list 170 for the page generator 110 (FIG. 1) to assemble a collection. The list 200 includes three entries 201-203; each entry in the list corresponds to a document in the collection and identifies a source, in this implementation a web document, for the corresponding document in the collection. For each entry, the exemplary list 200 includes three fields: a member field 210, a source field 220, and a parameter field 230. While the document lists illustrated in FIGS. 2A and 2B are represented as tables sharing a common set of fields in a common arrangement, other fields and/or other arrangements of fields can be used. Thus, for example, a document list can include more than one parameter field or no parameter field at all. Without a parameter field, optional parameters can be included in the source field, e.g., by encoding the parameters in a corresponding URL. The exemplary list 200 can be implemented as, e.g., a tab delimited file or an HTML document.

The member field 210 of an entry includes a document identifier that identifies a corresponding document in the collection. The document identifier can be, e.g., a file name, a path, or a URL for the document in the collection. In the example shown in FIG. 2A, the documents in the collection are identified as Article1, Article2, and Article3 corresponding to the first 201, second 202, and third 203 entries, respectively.

The source field 220 of an entry includes a source identifier that identifies a source for the corresponding document in the collection. The identified source can be, for example, a static web document or a document template. The page generator 110 can use the source identifier to request the static web document or a web document generated according to the document template. The source identifier can include a URL if the static web document or the document template can be accessed through the Web. Alternatively, the source identifier can include a TCP/IP address, a domain name, or any other identifier, such as Uniform Resource Identifiers ("URIs"). In the example shown in FIG. 2A, all three entries 201-203 have the same source identifier that identifies the URL of a document template (that is, a class of web documents) on a publishing web site. In alternative implementations, each entry can identify a different document template, static web document, or any other source.

The parameter field 230 of an entry can include one or more parameters that can be used by a server to generate a web document according to a document template. For example, instructions in the document template can use the parameters to make calls, such as database calls to incorporate content in a database into the web document. Alternatively, the parameters can be used by the document template to specify layout features, such as an arrangement of elements in the web document. In the example shown in FIG. 2A, the parameters identify content from the publishing web site including "headline" news for the first entry 201, news about "politics" for the second entry 202, and news in the "world" for the third entry 203.

Based on the list 200, the page generator 110 can assemble the collection of documents from the web documents generated according to the document template in the news publishing web site. Techniques for assembling the collection are discussed with reference to FIGS. 3-5. The assembled collection can be used as a "static publishing" web site whose accessibility does not depend on the performance of databases used to generate the web documents. For example, documents in the collection can be made accessible as static web documents through the same web server that generated the web documents according to the document template. In this implementation, the web server can serve a static web document in the collection instead of a corresponding web document generated according to the document template. In an alternative implementation, another web server can serve the static web documents in the collection as a new web site. Static publishing can be advantageous compared to web documents generated dynamically using a database, for example, when the database is slow or unavailable during update, or high demand.

FIG. 2B shows a second exemplary list 250 that can be used as the document list 170 for the page generator 110 (FIG. 1). The list 250 includes two entries 251-252; each entry in the list corresponds to a document in a collection to be assembled. Like the list 200, the list 250 has three fields. A member field 210' identifies documents in the collection: one document for "Joe" and another one for "Jill". For both documents, a source field 220' identifies the URL of the same document template. The parameter field 230' specifies that the document template will incorporate data about Joe's expenses in June for the "Joe" document, and data about Jill's expenses in June for the "Jill" document.

Based on the list 250, the page generator can generate an expense report for June that includes a static document for Joe's expenses, and another static document for Jill's expenses. By mounting, i.e., connecting, the static documents to a web server, they can be made available as part of a web site. The static web documents in the web site may be available even if the document template identified in the source field 220' is not.

Figure 3:
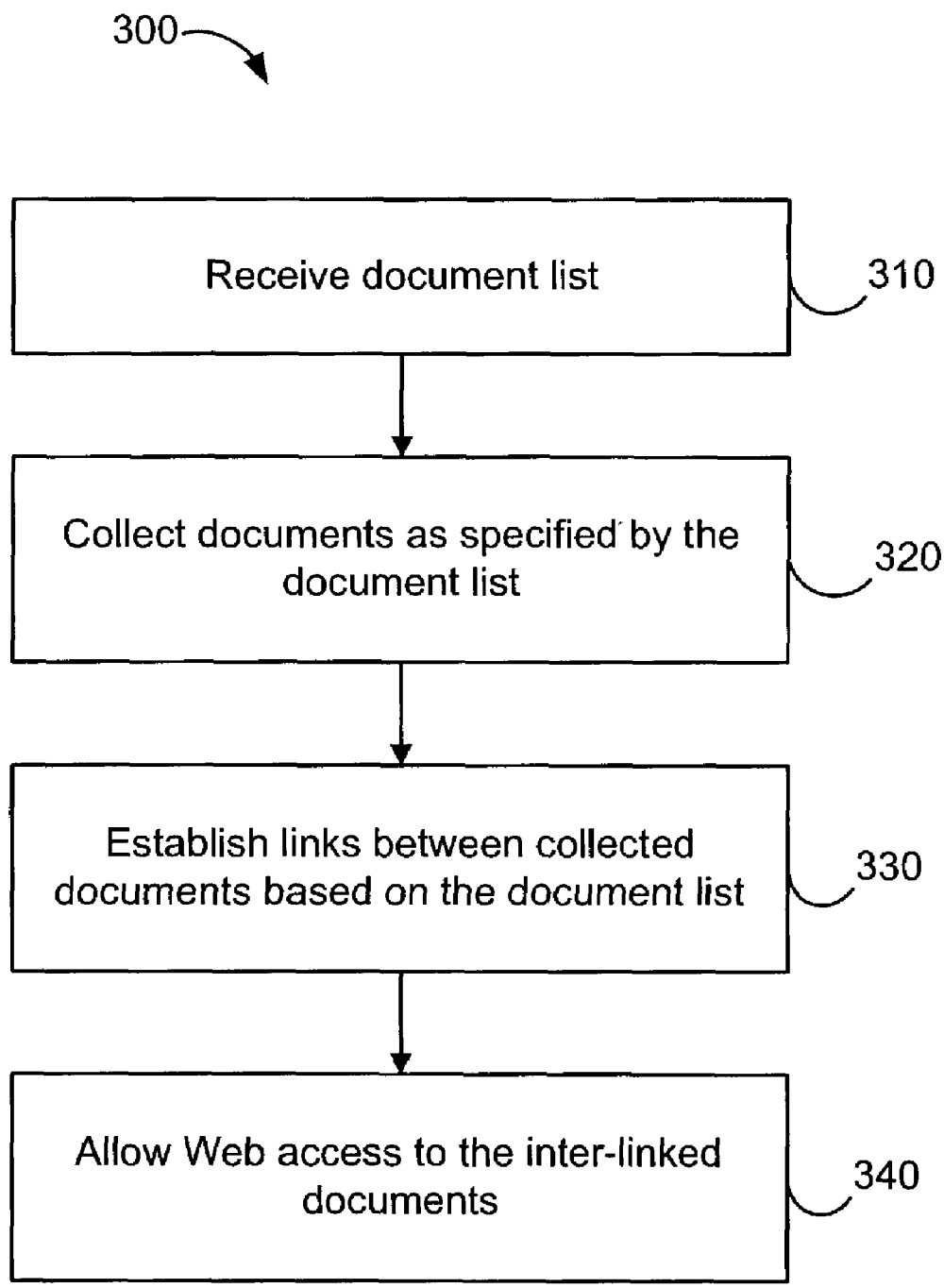
FIGS. 3-5 are flowcharts showing methods for assembling a collection of documents.

FIG. 3 shows a method 300 for assembling a collection of documents according to one aspect of the invention. The assembling method 300 can be performed, for example, by the page generator 110 shown in FIG. 1.

The page generator receives a document list (step 310). As discussed above with reference to FIGS. 2A and 2B, the document list identifies sources, such as web documents, for corresponding documents in the collection to be assembled. The document list can be received from a user or from a computer application. The document list can be sent to the page generator through a computer network, such as the Internet.

In one implementation, the document list, or a portion of it, is received in response to a request that identifies a document template and a set of parameters. The set of parameters can be used to identify documents that are generated according to the document template and will be included in the collection. For example, the page generator can query a web server. The query can identify a document template, e.g., by a URL, and ask the web server to identify web documents that can be generated according to the identified document template. Optionally, the query can include search parameters. In response, the web server can identify a set of web documents based on the search parameters, and send the URLs of the web documents in the set to the page generator. The page generator can use the returned URLs to complete the document list, or to prepare an explicit document list from an implicit one. Alternatively, instead of the page generator, another application can query the server, prepare the document list, and send it to the page generator.

The page generator collects documents (step 320). In one implementation, the page generator iterates through the entries of the received document list and, for each entry, transmits to a web server a request including a source identifier and any specified parameters. The web server retrieves a web document based on the request and serves the web document to the page generator. The page generator stores the received web document in the collection. Collecting documents is discussed in more detail with reference to FIG. 4.

The page generator establishes links between the collected documents (step 330). In one implementation, the documents are collected and the corresponding links are established by the collector 114 and the link engine 116 of the page generator (FIG. 1), respectively. Establishing links between the documents are discussed in more detail with reference to FIG. 5.

The page generator can allow access to the inter-linked documents in the collection (step 340) through a web server. For example, the page generator can send the file names of the documents in the collection to the web server. Based on the received file names, the web server can assign URLs to the documents in the collection to provide web access. Alternatively, a user can mount the inter-linked documents of the collection on a web server.

Figure 4:
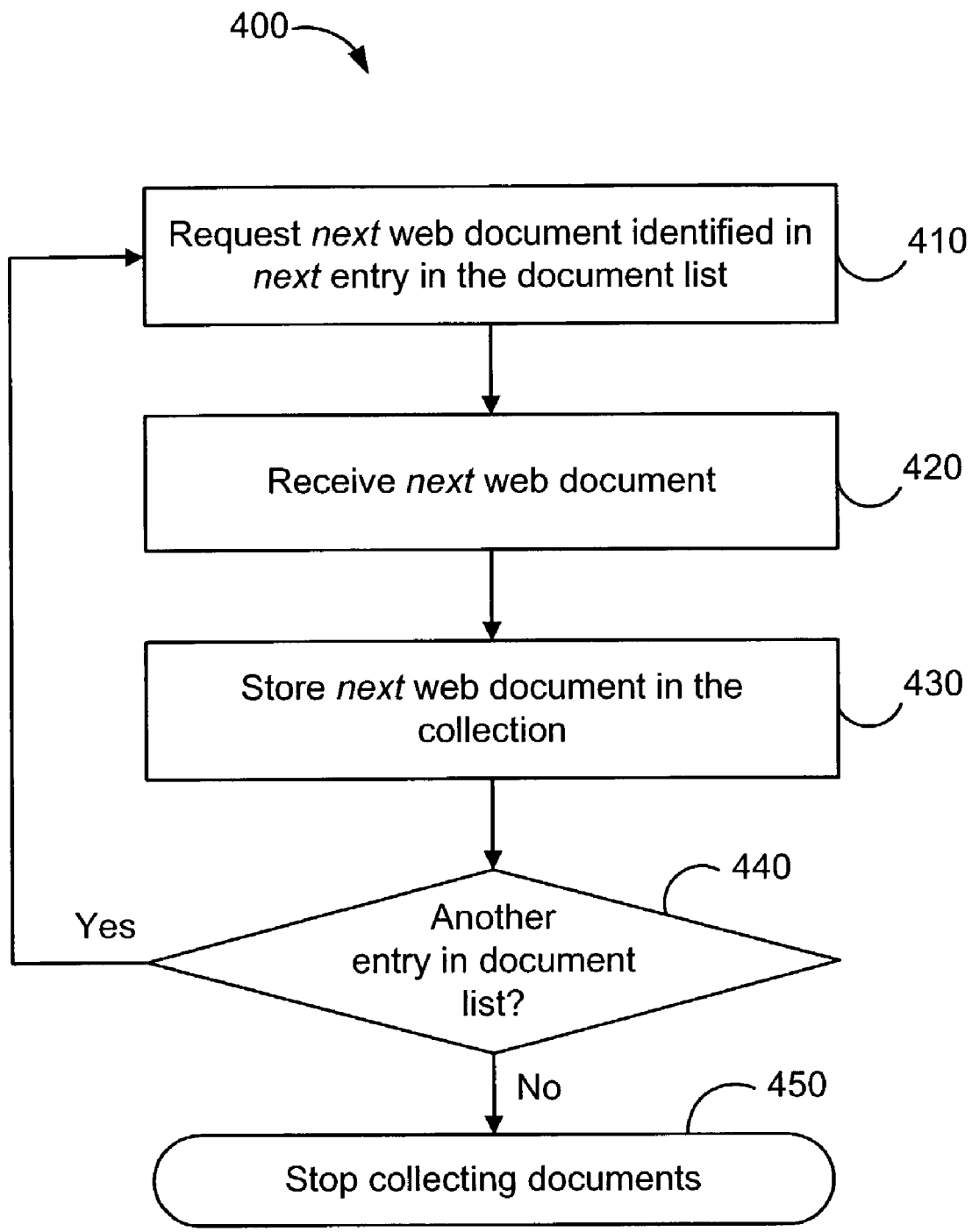

FIG. 4 shows a method 400 for collecting documents for a collection according to one aspect of the invention. The collecting method 400 can be performed, for example, by the collector 114 in the page generator 110 shown in FIG. 1. The collecting method 400 uses a document list, such as the document lists described above with reference to FIGS. 2A and 2B, where each entry in the document list identifies a source web document and a corresponding document in the collection.

The collector takes a next entry in the document list and requests a next web document identified in the next entry (step 410). To start the collecting method 400, the next entry can be, e.g., the first entry in the document list. The next entry can identify the next web document, e.g., by a URL and, optionally, additional parameters. In one implementation, the parameters are encoded into a URL to request the next web document. The next web document can be a static web document or generated according to a document template, and can be requested from a web server directly or through a computer network such as the Internet.

The collector receives the next web document (step 420), and stores the received web document in the collection as the document identified in the next entry (step 430). For example, the collector can save the received web document as a file named as the document identifier in the next entry (see FIGS. 2A and 2B). In one implementation, the next web document is received from a web site that includes multiple levels of directories, and the received web document is stored in a subdirectory that matches the subdirectory of the next web document in the web site. By duplicating the directory structure of the web site, the documents in the collection will have the same hierarchical relationships as the web documents in the web site.

The collector verifies the document list (decision 440). If the list includes an entry identifying a web document that has not been requested yet ("Yes" branch of decision 440), the collector requests the web document (i.e., returns to step 410). If there is no such entry left in the document list ("No" branch of decision 440), the collector stops collecting documents for the collection (step 450).

Figure 5:
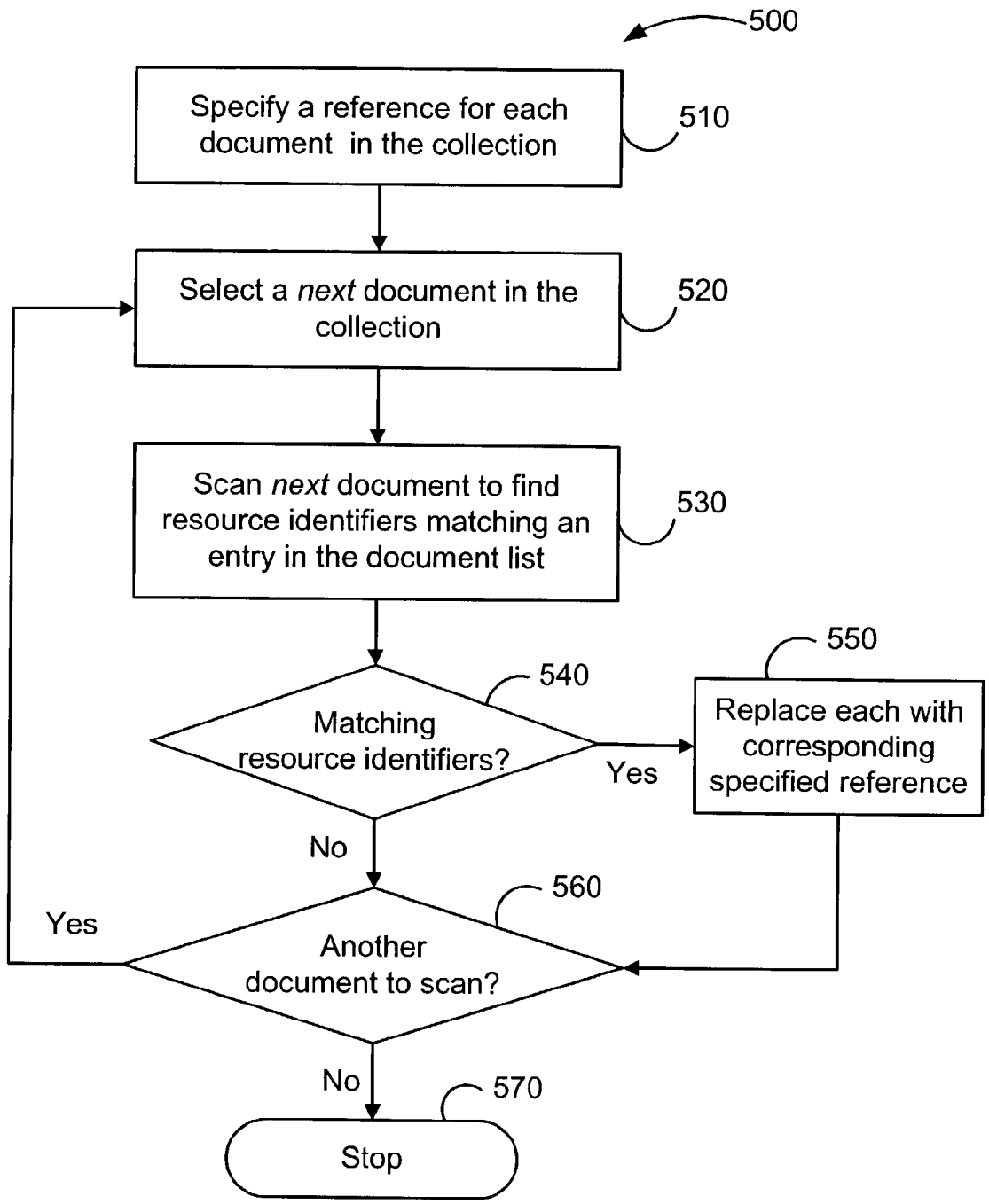

As shown in FIG. 5, relative links between the collected documents can be established by using a linking method 500 that can be performed, for example, by the link engine 116 of the page generator 110 (FIG. 1). The linking method 500 uses a document list, such as the document lists described above with reference to FIGS. 2A and 2B where each entry in the document list identifies a web document and a corresponding document in the collection.

The link engine specifies a reference for each document in the collection (step 510). The specified references can be based on a reference system that can be used to retrieve each document in the collection. For example, a specified reference can include relative links, a file name of the document, or a path to a file directory where the document is located.

The link engine selects a next document in the collection (step 520). For the first selection, the next document can be, e.g., the document identified in the first entry in the document list.

The link engine scans the next document to find resource identifiers that match an entry in the document list (step 530). For example, the link engine parses a markup language, e.g., HTML, document to find tags that identify links. The identified links are compared to source identifiers and parameters in the document list. Typically, a matching resource identifier is a link that has been used to request a web document identified by an entry in the document list. For example, the matching resource identifier can include a URL of a web document identified by an entry in the document list. If the web document is generated according to a document template, the matching resource identifier can include parameters specified in the corresponding entry in the document list. Optionally, the link engine can match different resource identifiers with the same entry in the document list, for example, when the entry identifies a web document that can be referenced by URLs including different parameter values.

The link engine verifies if any matching resource identifier have been found during the scan of the next document (decision 540). If one or more resource identifiers match entries in the document list ("Yes" branch of decision 540), for each such entry, the link engine identifies the corresponding document in the collection, and replaces the matching resource identifier with the reference specified for the corresponding document (step 550). Optionally, the link engine can replace each matching resource identifier when it is found during the scan of the next document.

When all matching resource identifiers have been replaced, or no matching resource identifier is found ("No" branch of decision 540), the link engine verifies if all the documents in the collection have been scanned (decision 560). If the collection includes at least one document that has not been scanned yet ("Yes" branch of decision 560), the link engine selects one such document (i.e., returns to step 520). If there is no such document left in the collection ("No" branch of decision 560), the link engine stops (step 570). By linking the documents in the collection to each other as described above, the collection can be mounted on a web server and used as a static web site.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a database, or that includes a middleware component, e.g., an application connecting a data source to a Web server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:
1. A method comprising:
   receiving at a server one or more document templates, each template identifying a class of documents and including instructions executable by a web server to generate a particular static document of the class;

receiving a document list including a plurality of entries, each of the plurality of entries identifying a document template where an entry identifying a particular document template also specifies a particular document of the class to be generated from the particular document template;

generating a plurality of static documents according to the document list, each static document corresponding to an entry in the document list, each static document generated from a corresponding document template identified in the document list;

for a generated static document of the plurality of static documents identifying one or more links within the generated static document, and for each link that includes a reference to an entry in the document list modifying the link to refer to the corresponding generated static document;

storing the plurality of static documents in a collection of documents, the collection of documents having a hierarchical structure;

receiving a user request for a document;

when the request corresponds to an entry in the document list, serving the previously generated static document from the collection of documents corresponding to the entry; and when the request does not correspond to an entry in the document list, dynamically generating the requested document.

2. The method of claim 1, wherein:
receiving a user request for the document includes receiving a request for the document through the Internet.

3. The method of claim 1, wherein:
each entry in the document list represents a web document.

4. The method of claim 1, wherein:
the document list includes one or more entries representing static web documents to be included in the collection of documents.

5. The method of claim 1, further comprising:
providing access to the collection of documents as part of a web site.

6. The method of claim 1, wherein:
one or more of the entries in the plurality of entries specifies one or more parameters for generating a corresponding static document according to the document template identified in the corresponding entry; and
generating a document corresponding to an entry identifying a document template includes passing the one or more parameters specified by the entry to a web server for use in generating the corresponding document.

7. The method of claim 1, wherein:
one or more of the document templates includes instructions implemented in ASP, JSP, or PHP technology.

8. The method of claim 1, wherein:
the document list represents documents to be included in the collection of documents, the documents identified by a URL or a URI.

9. The method of claim 1, wherein:
generating a document includes generating an HTML document.

10. The method of claim 1, wherein:
receiving a document list includes receiving a document list from a user.

11. The method of claim 1, wherein:
receiving the document list includes receiving at least a portion of the document list in response to a request identifying a document template and a set of parameters, the set of parameters used to identify documents to be included in the collection of documents.

12. The method of claim 11, further comprising:
transmitting the request to a web server to request all or a portion of the document list.

13. A computer program product, tangibly embodied in a machine-readable storage device, including instructions operable to cause data processing apparatus to:
receive at a server one or more document templates, each template identifying a class of documents and including instructions executable by a web server to generate a particular document of the class;

receive a document list including a plurality of entries, each of the plurality of entries identifying a document template where an entry identifying a particular document template also specifies a particular document of the class to be generated from the particular document template;

generate a plurality of static documents according to the document list, each static document corresponding to an entry in the document list, each static document generated from a corresponding document template identified in the document list;

for a generated static document of the plurality of static documents, identify one or more links within the generated static document, and for each link that includes a reference to an entry in the document list, modify the link to refer to the corresponding generated static document;

store the plurality of static documents in a collection of documents, the collection of documents having a hierarchical structure;

receive a user request for a document;

when the request corresponds to an entry in the document list, serve the previously generated static document from the collection of documents corresponding to the entry; and when the request does not correspond to an entry in the document list, dynamically generate the requested document.

14. The computer program product of claim 13, wherein:
the instructions operable to cause data processing apparatus to receive a user request for the document include instructions operable to cause data processing apparatus to receive a request for the document through the Internet.

15. The computer program product of claim 13, wherein:
each entry in the document list represents a web document.

16. The computer program product of claim 13, wherein:
the document list includes one or more entries representing static web documents to be included in the collection of documents.

17. The computer program product of claim 13, further comprising instructions operable to cause data processing apparatus to:
provide access to the collection of documents as part of a web site.

18. The computer program product of claim 13, wherein:
one or more of the entries in the plurality of entries specifies one or more parameters for generating a corresponding document according to the document template identified in the corresponding entry; and
instructions operable to cause data processing apparatus to generate a document corresponding to an entry identifying a document template includes instructions operable to cause data processing apparatus to pass the one or more parameters specified by the entry to a web server for use in generating the corresponding document.

19. The computer program product of claim 13, wherein: one or more of the document templates includes instructions implemented in ASP, JSP, or PHP technology.

20. The computer program product of claim 13, wherein: the document list represents documents to be included in the collection of documents, the documents identified by a URL or a URI.

21. The computer program product of claim 13, wherein: the instructions operable to cause data processing apparatus to generate a document include instructions operable to cause data processing apparatus to generate an HTML document.

22. The computer program product of claim 13, wherein: the instructions operable to cause data processing apparatus to receive a document list include instructions operable to cause data processing apparatus to receive a document list from a user.

23. The computer program product of claim 13, wherein: the instructions operable to cause data processing apparatus to receive the document list include instructions operable to cause data processing apparatus to receive at least a portion of the document list in response to a request identifying a document template and a set of parameters, the set of parameters used to identify documents to be included in the collection of documents.

24. The computer program product of claim 23, further comprising instructions operable to cause data processing apparatus to:
transmit the request to a web server to request all or a portion of the document list.

25. The method of claim 1, where the received user request is a URL identifying a dynamic web page.

26. A system comprising:
means for receiving at a server one or more document templates, each template identifying a class of documents and including instructions executable by a web server to generate a particular document of the class;

means for receiving a document list including a plurality of entries, each of the plurality of entries identifying a document template where an entry identifying a particular document template also specifies a particular document of the class to be generated from the particular document template;

means for generating a plurality of static documents according to the document list, each static document corresponding to an entry in the document list, each static document generated from a corresponding document template identified in the document list;

for a generated static document of the plurality of static documents, means for identifying one or more links within the generated static document, and for each link that includes a reference to an entry in the document list, means for modifying the link to refer to the corresponding generated static document;

means for storing the plurality of static documents in a collection of documents, the collection of documents having a hierarchical structure;

means for receiving a user request for a document;

when the request corresponds to an entry in the document list, means for serving the previously generated static document from the collection of documents corresponding to the entry; and when the request does not correspond to an entry in the document list, means for dynamically generating the requested document.

\* \* \* \* \*